US009664288B2

(12) United States Patent
Ikeda

(10) Patent No.: US 9,664,288 B2
(45) Date of Patent: May 30, 2017

(54) SHAFT SEAL DEVICE

(75) Inventor: Yasuhiro Ikeda, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 95 days.

(21) Appl. No.: 14/237,137

(22) PCT Filed: Aug. 13, 2012

(86) PCT No.: PCT/JP2012/070642
§ 371 (c)(1),
(2), (4) Date: Feb. 4, 2014

(87) PCT Pub. No.: WO2013/035501
PCT Pub. Date: Mar. 14, 2013

(65) Prior Publication Data
US 2014/0175756 A1     Jun. 26, 2014

(30) Foreign Application Priority Data
Sep. 6, 2011    (JP) .................................. 2011-194334

(51) Int. Cl.
*F16J 15/32*      (2016.01)
*F02C 3/02*      (2006.01)
(Continued)

(52) U.S. Cl.
CPC ............. *F16J 15/32* (2013.01); *F16J 15/162* (2013.01); *F16J 15/164* (2013.01);
(Continued)

(58) Field of Classification Search
CPC ...... F16J 15/324; F16J 15/3244; F16J 15/162; F16J 15/164; F16J 15/32; F16J 15/3204; F16J 15/3284; F16C 3/00; F16C 3/02
See application file for complete search history.

(56) References Cited

U.S. PATENT DOCUMENTS 3,259,393 A   *   7/1966   Dega .................... F16J 15/3244
                                                          277/559
3,586,340 A   *   6/1971   Otto ..................... F16J 15/3244
                                                           277/400
(Continued)

FOREIGN PATENT DOCUMENTS

EP        1 108 927       6/2001      ............... F16J 15/32
JP        01-312274     12/1989     ............... F16J 15/32
(Continued)

OTHER PUBLICATIONS

International Preliminary Report on Patentability issued in corresponding application No. PCT/JP2012/070642, dated Mar. 20, 2014 (7 pgs).

(Continued)

*Primary Examiner* — Nicholas L Foster
(74) *Attorney, Agent, or Firm* — Hayes Soloway P.C.

(57) ABSTRACT

A lip seal-type shaft seal device that exhibits no leakage when at rest; operates under fluid lubrication and prevents leakage when rotating, including during initial rotation; and enables a balance between seal integrity and lubrication is provided. The device includes a plurality of discontinuous pumping areas for generating pumping action via the relative rotational sliding of a lip seal and a rotating member is formed in the circumferential direction on the outer circumferential surface of the rotating member. The plurality of pumping areas is provided with suction portion of pumping areas operating in a direction in which a sealed fluid is drawn in and discharge portion of pumping areas operating in a direction in which the sealed fluid is expelled. A lip of the lip of the lip seal extends in an axial direction towards an atmosphere side, leaving part of the pumping areas uncovered on a sealed fluid side.

17 Claims, 13 Drawing Sheets

(51) Int. Cl.
*F16J 15/16* (2006.01)
*F16J 15/3244* (2016.01)
*F16J 15/3212* (2016.01)
*F16J 15/324* (2016.01)

(52) U.S. Cl.
CPC ....... *F16J 15/3212* (2013.01); *F16J 15/3244* (2013.01); *F02C 3/02* (2013.01); *F16J 15/324* (2013.01)

(56) References Cited

U.S. PATENT DOCUMENTS

| | | | | |
|---|---|---|---|---|
| 3,934,888 | A * | 1/1976 | Lutz | F16J 15/3244 277/559 |
| 5,002,289 | A * | 3/1991 | Yasui | F16J 15/3244 277/559 |
| 5,447,316 | A * | 9/1995 | Matsui | F16J 15/3412 277/400 |
| 6,170,834 | B1 | 1/2001 | Vogt | 277/559 |
| 6,454,268 | B1 * | 9/2002 | Muraki | F16J 15/3484 277/361 |
| 8,408,555 | B2 * | 4/2013 | Garrison | F16C 17/045 277/306 |
| 8,905,408 | B2 * | 12/2014 | Garrison | F01D 11/02 277/348 |
| 2007/0069222 | A1 | 3/2007 | Ko et al. | 257/86 |
| 2008/0088094 | A1 * | 4/2008 | Borowski | F16J 15/324 277/559 |
| 2011/0101616 | A1 * | 5/2011 | Teshima | F16J 15/3424 277/358 |
| 2011/0115164 | A1 * | 5/2011 | Vasagar | F16J 15/3244 277/306 |
| 2014/0159314 | A1 * | 6/2014 | Hosoe | F16J 15/3412 277/358 |
| 2014/0167361 | A1 * | 6/2014 | Osada | F16J 15/34 277/400 |
| 2014/0167362 | A1 * | 6/2014 | Hosoe | F16J 15/3244 277/400 |
| 2014/0197600 | A1 * | 7/2014 | Hosoe | F16J 15/3412 277/409 |
| 2014/0217676 | A1 * | 8/2014 | Hosoe | F16J 15/3412 277/350 |
| 2014/0353925 | A1 * | 12/2014 | Oshima | F16J 15/3244 277/552 |
| 2015/0097344 | A1 * | 4/2015 | Hamamoto | F16J 15/3244 277/550 |

FOREIGN PATENT DOCUMENTS

| | | | | |
|---|---|---|---|---|
| JP | 10-331985 | 12/1998 | ............... | F16J 15/32 |
| JP | 2001-214979 | 8/2001 | ............... | F16J 15/32 |
| JP | 2005-273693 | 10/2005 | ............... | F16J 15/32 |
| JP | 2007096300 | 4/2007 | ............... | H01L 33/32 |
| JP | 2009-257421 | 11/2009 | ............... | F04B 39/00 |
| JP | 2009-278139 | 11/2009 | ............... | H01L 33/32 |

OTHER PUBLICATIONS

Chinese Office Action (with translation) issued in application No. 201280039579.1, dated Mar. 27, 2015 (15 pgs).
International Search Report issued in corresponding PCT Patent Appln. Serial No. PCT/JP2012/070642 dated Oct. 9, 2012, with English translation (4 pgs).
Chinese Office Action (with translation) issued in application No. 201280039579.1, dated Sep. 2, 2015 (4 pgs).

* cited by examiner

Prior Art

Prior Art

SHAFT SEAL DEVICE

TECHNICAL FIELD

The present invention relates to a shaft seal device with a lip-type seal for creating a seal between a housing and a rotating shaft.

BACKGROUND ART

In existing lip-type seals mounted on a fixed housing and slidingly sealing the surface of a rotating shaft, attempts have been made, out of consideration for environmental concerns, to reduce friction via measures such as optimizing the shape, dimensions, and material of the lip; coating the lip sealing face or the counterpart shaft surface; or optimizing the roughness of the counterpart shaft surface.

In cases in which a coating is applied to the lip sealing face or the counterpart shaft surface or in which the roughness of the counterpart shaft surface is optimized, there is the problem that effects are only obtained initially, and low friction cannot be maintained due to wear over time.

Meanwhile, as an example of a shaft seal device with improved lubrication properties, the sealing means shown in FIG. 12 (hereafter, "first prior art"; see, for example, patent document 1) is known.

The first prior art incorporates a lip-type seal 51 attached to a housing 50, the lip-type seal 51 having a sealing edge 53 disposed so as to contact a rotating shaft 52, and is provided with an arrow-shaped groove 55 in which grooves 56 and ridges 57 are alternatingly provided within a contact zone 54 in which the sealing edge 53 contacts the surface of the rotating shaft. When the rotating shaft 52 rotates within the housing 50, the arrow-shaped groove 55 creates a pumping effect, repelling foreign matter intruding from the atmosphere side and maintaining a seal effect by pushing back fluid from a sealed fluid side.

Shaft seal devices provided with a spiral-shaped groove in lieu of the arrow-shaped groove of the first prior art are also known (for example, see patent document 2).

The sealing means shown in FIG. 13 (hereafter, "second prior art"; for example, see patent document 3) is further known as an example of a shaft seal device that balances torque reduction with seal properties.

The second prior art has a seal lip 60 for sealing off a sealed fluid and a screw pump mechanism 64 disposed on the atmosphere side of the seal lip 60 and comprising a screw 62 formed on the surface of a rotating shaft 61 and a cylindrical part 63, and the screw pump mechanism 64 exerts a fluid pumping action upon the seal lip 60 to substantially reduce the tension of the seal lip 60, thereby ensuring seal properties through the agency of the seal lip 60 and reducing torque on the seal lip 60 through the agency of the screw pump mechanism 64.

However, because the shaft seal device according to the first prior art shown in FIG. 12 is structured so that the sealing edge 53 of the lip-type seal 51 contacts the arrow-shaped groove 55 formed from a material of high hardness in the contact zone 54 on the surface of the rotating shaft, the sealing edge 53 wears down quickly. Moreover, the grooves 56 of the arrow-shaped groove 55 have a "V-shape" directly connecting the atmosphere side and the sealed fluid side along the axial direction of the shaft, and the apical part of the sealing edge 53 does not contact with the V-shaped grooves 56, so that the sealed fluid side and the atmosphere are in a state of constant communication, resulting in the possibility of sealed fluid leaking to the atmosphere side when the device is at rest. It is known that a shaft surface roughness of 2.5 μm or greater can cause leakage when at rest in normal oil seals. In the case of the first prior art, severe leakage will occur when the depth of the grooves 56 is 2.5 μm or greater.

A shaft seal device provided with a spiral-shaped groove in lieu of the arrow-shaped groove of the first prior art has problems similar to those of the first prior art, in that the shape of the spiral-shaped groove allows for direct communication between the atmosphere side and the sealed fluid side via the spiral-shaped groove.

Furthermore, in the shaft seal device according to the second prior art shown in FIG. 13, the reduction on the tension on the seal lip 60 in order to reduce the torque of the seal lip 60 leads to the problems of reductions in the seal properties of the seal lip 60 and infiltration of the atmosphere into the sealed fluid side.

PRIOR ART DOCUMENT

Patent Documents

Patent Document 1: Japanese Laid-Open Patent Application No. 2001-214979
Patent Document 2: Japanese Laid-Open Patent Application No. H10-331985
Patent Document 3: Japanese Laid-Open Patent Application No. 2005-273693

SUMMARY OF INVENTION

The present invention was contrived in order to solve the problems in the prior art described above, it being an object thereof to provide a lip seal-type shaft seal device that exhibits no leakage when at rest, operates under fluid lubrication and prevents leakage when rotating, including during initial rotation, and enables a balance between seal integrity and lubrication.

Means of Solving the Problem

In order to achieve the object described above, a first aspect of the shaft seal device according to the present invention consists in a shaft seal device featuring a lip-type seal, the device provided with a lip seal for creating a seal between a rotating member and a stationary member concentrically disposed inside and outside each other with respect to the radial direction; characterized in:

a plurality of pumping areas for generating pumping action via relative rotational sliding of the lip seal and the rotating member being discontinuously formed in a circumferential direction on an outer circumferential surface of the rotating member;

the plurality of pumping areas being provided with suction portion of pumping areas operating in a direction in which the sealed fluid is drawn in and discharge portion of pumping areas operating in a direction in which the sealed fluid is expelled; and a lip of the lip seal extending in an axial direction toward an atmosphere side, leaving part of the pumping areas towards a sealed fluid side uncovered.

Secondly, the shaft seal device according to the first aspect of the present invention is characterized in the lip of said lip seal extending in an axial direction toward an atmosphere side so as to cover said pumping areas, leaving part of said pumping areas toward the sealed fluid side uncovered, and being set so as to be in sliding contact with the outer circumferential surface of the rotating member closer to the atmosphere side than said pumping areas.

Thirdly, the shaft seal device according to the first aspect of the present invention is characterized in the lip of the lip seal being set so as to be in sliding contact with the outer circumferential surface of the rotating member in which the pumping areas are formed, leaving a part of the pumping areas toward the sealed fluid side and a part thereof toward the atmosphere side with respect to the axial direction of the rotating member uncovered.

Fourthly, the shaft seal device according one of the first through the third aspects of the present invention is characterized in the pumping areas having periodic linear indentation structures, and the linear indentations being formed so that the direction of the indentations is inclined at a predetermined angle with respect to the sliding direction of the sealing faces.

Fifthly, the shaft seal device according to the fourth aspect of the present invention is characterized in the plurality of pumping areas being formed so that the directions of the linear indentations of adjacent pumping areas are symmetrical with respect to the sliding direction of the sealing faces.

Sixthly, the shaft seal device according to the fourth or fifth aspect of the present invention are characterized in the periodic linear indentation structures of the pumping areas being formed via irradiation with a femtosecond laser.

Seventhly, the shaft seal device according to one of the first through the sixth aspects of the present invention is characterized in the pumping areas being provided in the bottom surfaces of a plurality of indentations formed in the outer circumferential surface of the rotating member.

Eighthly, the shaft seal device according to one of the fourth through the seventh aspects of the present invention is characterized in the suction portion of pumping areas being formed so that the linear indentations grow progressively deeper in the rotational direction of the rotating shaft as seen from the side, and the discharge portion of pumping areas being formed so that the rectilinear indentations grow progressively shallower in the rotational direction of the rotating shaft as seen from the side.

Ninthly, the shaft seal device according to the seventh aspect of the present invention is characterized in the upper edges of the plurality of indentations being machined into a tapered or arcuate shape.

Tenthly, the shaft seal device according to one of the first through the ninth aspects of the present invention is characterized in the pumping displacement of the suction portion of pumping areas in the pumping areas formed in the bottom surfaces of the plurality of indentations and the pumping displacement of the discharge portion of pumping areas being the same, or the pumping displacement of one being greater than that of the other.

Eleventhly, the shaft seal device according to one of the fourth through the tenth aspects of the present invention is characterized in the pitch of the linear indentations of the discharge portion of pumping areas in the pumping areas formed in the bottom surfaces of the plurality of indentations being less than the pitch of the linear indentations of the suction portion of pumping areas.

Twelfthly, the shaft seal device according to one of the fourth through the eleventh aspects of the present invention is characterized in the width or depth of the linear indentations of the discharge portion of pumping areas in the pumping areas formed in the bottom surfaces of the plurality of indentations being greater than the width or depth of the linear indentations of the suction portion of pumping areas.

Thirteenthly, the shaft seal device according to one of the fourth through the twelfth aspects of the present invention is characterized in the length with respect to the radial direction or the circumferential direction of the discharge portion of pumping areas in the pumping areas formed in the bottom surfaces of the plurality of indentations being greater than the length with respect to the radial direction or the circumferential direction of the suction portion of pumping areas.

Effects of the Invention

The present invention yields the following superior effects.

(1) In accordance with the first aspect, leakage is prevented when the slide seal device is at rest by virtue of the lip of the lip seal being pressed against the outer circumferential surface of the rotating member, and a lubricant fluid film can quickly be formed upon activation by the sealed fluid being drawn into the pumping areas, lowering the sliding torque of the sealing faces and decreasing wear.

Furthermore, during operation, the sealed fluid is drawn into the suction portion of pumping areas, sent over the sealing faces to the separately located discharge portion of pumping areas, and returned to the sealed fluid side by the action of the discharge portion of pumping areas; this sealed fluid flow ensures the lubrication of the sealing faces, prevents leakage, and maintains seal properties.

(2) In accordance with the second aspect, the lip of the lip seal is pressed against the outer circumferential surface of the rotating member at a position closer to the atmosphere side than the pumping areas, thereby reliably preventing leakage when the slide seal device is at rest.

(3) In accordance with the third aspect, the lip of the lip seal is set so as to press against the outer circumferential surface of the rotating member in which the pumping areas are formed, allowing the length of the pumping areas with respect to the axial direction of the rotating shaft to be greater than the length of the lip seal with respect to the axial direction.

(4) In accordance with the fourth aspect, the pumping areas can be formed using periodic linear indentation structures, enabling easy pumping formation, and allowing for pumping performance to be modified by modifying the angle of inclination.

(5) The fifth aspect is favorable when the sealing faces rotate in two directions.

(6) In accordance with the sixth aspect, the periodic linear indentation structure of the pumping areas is formed via irradiation with a femtosecond laser, allowing for both directionality and machining position to be controlled, and enabling a desired periodic linear indentation structure to be formed within each of discontinuous small divisions.

(7) In accordance with the seventh aspect, the pumping areas are provided in the bottom surfaces of indentations formed in the outer circumference of the rotating members, allowing for the rapid formation of a lubricant fluid film upon activation using sealed fluid drawn into the indentations.

(8) In accordance with the eighth aspect, the suction portion of pumping areas are more capable of drawing in and sending sealed fluid to the discharge portion of pumping areas, and the discharge portion of pumping areas are more capable of returning the received sealed fluid to the sealed fluid side, thereby improving sealing face lubrication and leakage prevention.

(9) In accordance with the ninth aspect, the upper edges of the indentations are machined to a tapered or arcuate shape, allowing the lip of the lip seal and the outer circumferential surface of the rotating member to slide smoothly, and wear on the lip of the lip seal to be reduced.

(10) In accordance with the tenth aspect, the pumping displacement of the suction portion of pumping areas and the pumping displacement of the discharge portion of pumping areas can be set so as to be the same or so that the pumping displacement of one is greater than that of the other, thereby allowing the suction portion of or discharge portion of pumping displacement to be freely set according to the manner in which the shaft seal device is used.

(11) In accordance with the eleventh through the thirteenth aspects, the discharge portion of displacement of the discharge portion of pumping areas is greater than the suction portion of displacement of the suction portion of pumping areas, thereby returning sealed fluid flowing in from the suction portion of pumping areas to be returned to the sealed fluid side by the discharge portion of pumping areas, preventing leakage to the atmosphere side.

DESCRIPTION OF EMBODIMENTS

An embodiment of the shaft seal device according to the present invention will be described in detail with reference to the drawings, but the present invention should not be construed as being limited to such; various alterations, modifications, and improvements may be made according to the knowledge of a person skilled in the art within the scope of the present invention.

Embodiment 1

Figure 1:
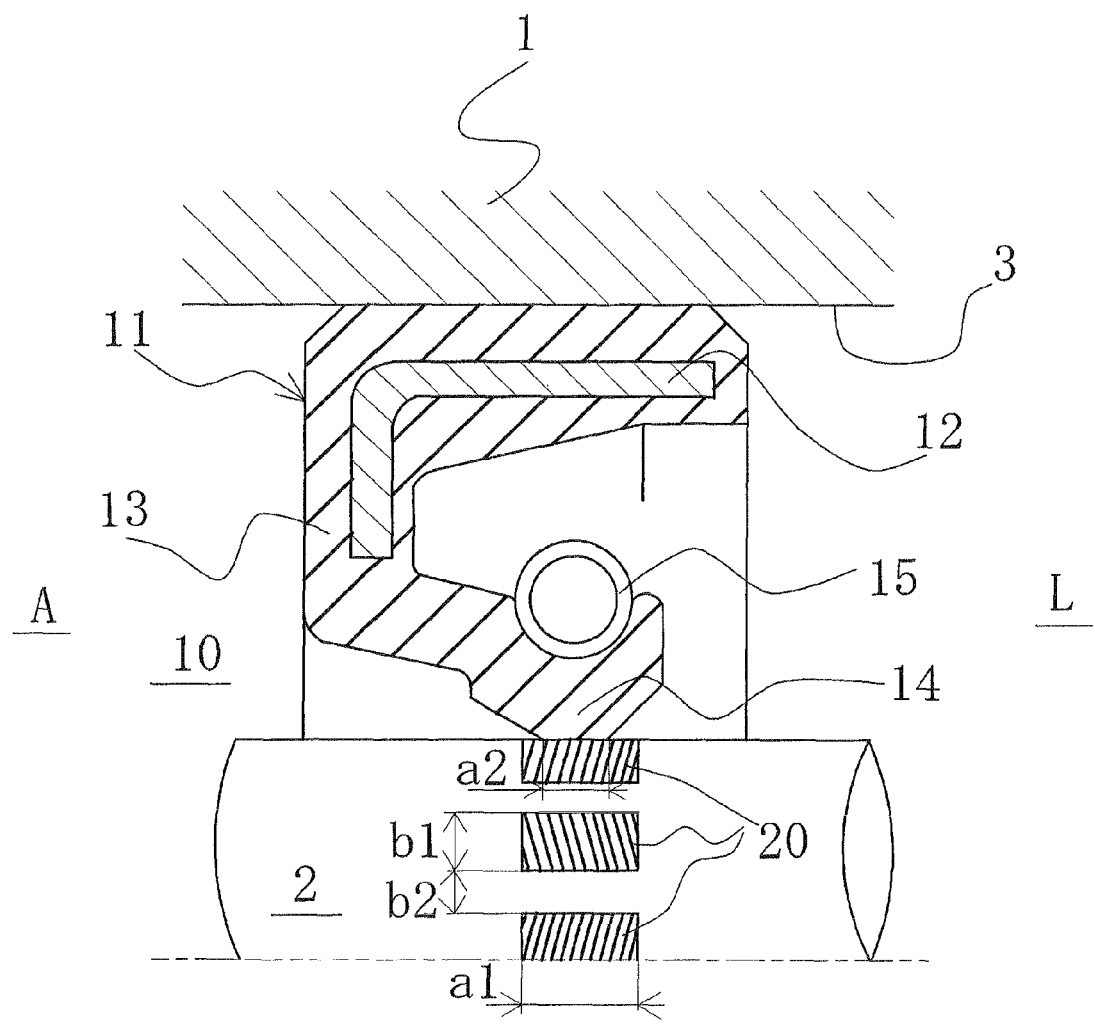
FIG. 1 is a longitudinal-sectional view of a shaft seal device according to a first embodiment of the present invention.

FIG. 1 is a longitudinal-sectional view of a shaft seal device according to a first embodiment of the present invention.

In FIG. 1, a rotating shaft through-hole 3 for inserting a rotating shaft 2 is provided in a housing 1, the rotating shaft 2 is inserted into the rotating shaft through-hole 3, and the rotating shaft 2 is supported by a bearing or the like, not shown in the drawings, so as to maintain a predetermined space between the shaft and the circumferential wall of the rotating shaft through-hole 3.

Considering a rotating member and a stationary member concentrically disposed to the inside and outside of one another in the radial direction of the rotating member, the housing 1 is equivalent to the stationary member, and the rotating shaft 2 is equivalent to the rotating member.

A shaft seal device 10 is disposed between the rotating shaft 2 and the circumferential wall of the rotating shaft through-hole 3, creating a seal between a sealed fluid side L and an atmosphere side A.

In FIG. 1, the right side is the sealed fluid side L, and the left side is the atmosphere side A.

The shaft seal device 10 is provided with a lip seal 11, and is configured so as to divide the circular space across which the housing 1 and the rotating shaft 2 face each other into a sealed fluid side L and an atmospheric pressure side A and cut off the inside and the outside thereof from each other; and a ring-shaped elastomer seal lip member 13 is affixed to a reinforcing ring 12 having a roughly sideways L-shaped cross section in the radial direction. The side of the rotating shaft 2 closer to the seal lip member 13, i.e., the inner circumference thereof, extends towards the sealed fluid side L and towards the inner circumference side, and has a roughly inverse triangle-shaped cross section, the edge-shaped part corresponding to the apex of the triangle forming a lip 14. When pressed against the outer circumferential surface of the rotating shaft 2, the edge of the lip 14 deforms, and is capable of sliding over the outer circumferential surface of the rotating shaft 2 within a predetermined axial direction contact width.

The outer circumference of the lip 14 is equipped with a garter spring 15 for pressing the lip 14 against the outer circumferential surface of the rotating shaft 2.

A plurality of pumping areas 20 is discontinuously formed with respect in the circumferential direction of the outer circumferential surface of the rotating shaft 2. The plurality of pumping areas 20 and the lip 14 of the seal lip member 13 are disposed so as to slide with the outer circumferential surface of the rotating shaft 20 in which the pumping areas 20 are formed in the axial direction, leaving a part of the pumping areas 20 on the sealed fluid side L. A part of the atmosphere side of the pumping areas 20 is not covered by the lip 14. In other words, a part of the pumping areas 20 toward the sealed fluid side L and a part toward the atmosphere side with respect to the axial direction are not covered by the lip 14.

In this way, each of the plurality of pumping areas 20 is separated from adjacent pumping areas 20 in the circumferential direction by parts of the outer circumferential surface in which pumping areas 20 are not formed, and communicate with the sealed fluid side L. The sealed fluid side L and the atmosphere side A are cut off from each other by the pressed contact of the lip 14.

An axial direction length a1 of the pumping areas 20 is slightly greater than a length a2 in which the lip 14 contacts the outer circumferential surface of the rotating shaft 2, and a circumferential direction length (arc surface length) b1 of the pumping areas 20 is the same or slightly greater than the circumferential direction length (arc surface length) b2 of the outer circumferential surface S between adjacent pumping areas 20, 20.

The pumping areas 20 will be described in detail hereafter.

Embodiment 2

Figure 2:
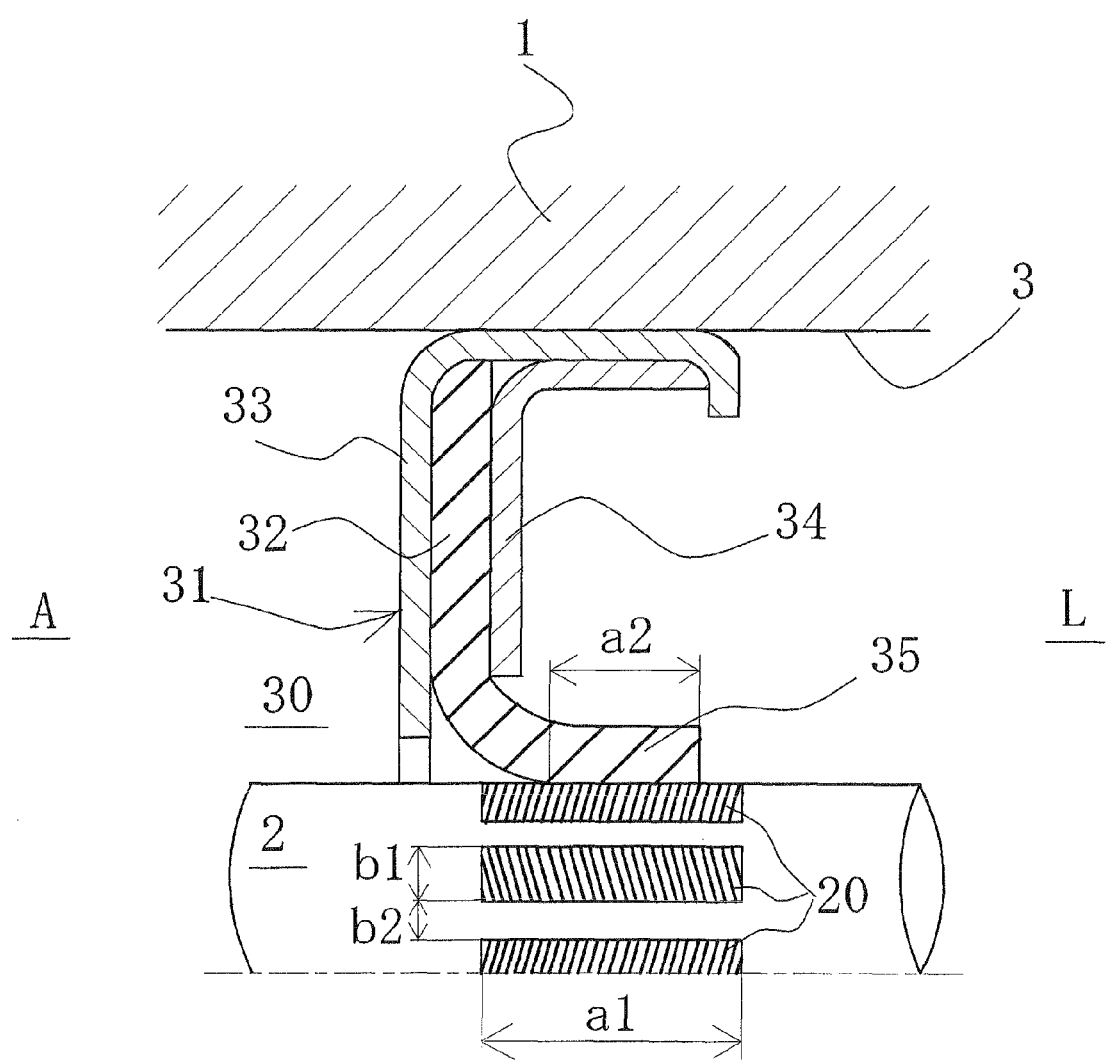
FIG. 2 is a longitudinal-sectional view of a shaft seal device according to a second embodiment of the present invention.

FIG. 2 is a longitudinal-sectional view of a shaft seal device according to a second embodiment of the present invention.

In FIG. 2, numbers identical to those shown in FIG. 1 signify members identical to those shown in FIG. 1, and detailed descriptions thereof will be omitted.

A shaft seal device 30 is provided with a lip seal 31, and is configured so as to divide a circular space across which a housing 1 and a rotating shaft 2 face each other into a sealed fluid side L and an atmospheric pressure side A and cut off the inside and the outside thereof from each other. The lip seal 31 is provided with a resin seal lip member 32 having an L-shaped cross section, the seal lip member 32 being clamped between an outer metal bond ring 33 having a roughly L-shaped cross section and an inner metal clamp ring 34 having a roughly L-shaped cross section.

A cylindrical lip 35 is formed on the inner circumference side of the seal lip member 32 having an L-shaped cross section, the cylindrical lip 35 being strongly pressed against the outer circumferential surface of the rotating shaft 2, sealing in the sealed fluid.

A plurality of discontinuous pumping areas 20 is formed in the circumferential direction of the outer circumferential surface of the rotating shaft 2 near the area when the cylindrical lip 35 and the outer circumferential surface of the rotating shaft 2 are in contact. The pumping areas 20 are essentially identical to the pumping areas 20 of the first embodiment.

As in the case of the first embodiment, the plurality of pumping areas 20 and the cylindrical lip 35 of the seal lip member 32 is disposed so as to slide with the outer circumferential surface of the rotating shaft 20 in which the pumping areas 20 are formed in the axial direction thereof, leaving a part of the pumping areas 20 on the sealed fluid side L. A part of the atmosphere side of the pumping areas 20 is not covered by the cylindrical lip 35. In other words, a part of the pumping areas 20 toward the sealed fluid side L and a part toward the atmosphere side with respect to the axial direction are not covered by the cylindrical lip 35.

In this way, each of the plurality of pumping areas 20 is separated from adjacent pumping areas 20 in the circumferential direction by parts of the outer circumferential surface in which pumping areas 20 are not formed, and communicate with the sealed fluid side L. The sealed fluid side L and the atmosphere side A are cut off from each other by the pressed contact of the cylindrical lip 35.

An axial direction length a1 of the pumping areas 20 is slightly greater than an axial direction length a2 in which the cylindrical lip 35 contacts the outer circumferential surface of the rotating shaft 2, and a circumferential direction length (arc surface length) b1 of the pumping areas 20 is the same or slightly greater than the circumferential direction length (arc surface length) b2 of the outer circumferential surface S between adjacent pumping areas 20, 20.

The pumping areas 20 will be described in detail hereafter.

Embodiment 3

Figure 3:
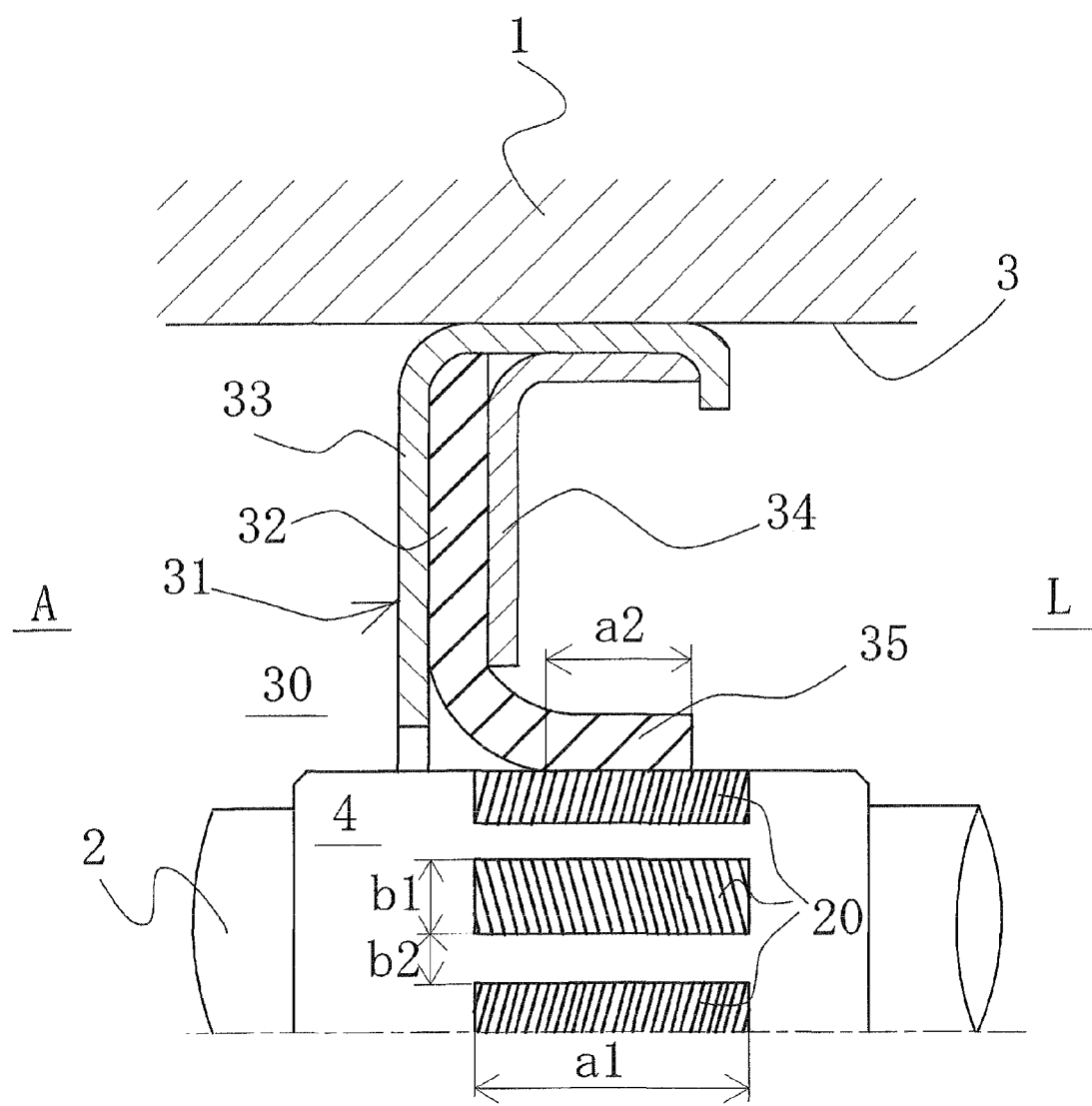
FIG. 3 is a longitudinal-sectional view of a shaft seal device according to a third embodiment of the present invention.

FIG. 3 is a longitudinal-sectional view of a shaft seal device according to a third embodiment of the present invention.

In FIG. 3, numbers identical to those shown in FIG. 2 signify members identical to those shown in FIG. 1, and detailed descriptions thereof will be omitted.

The third embodiment differs from the second embodiment in that a seal sleeve 4 is mated to the rotating shaft 2, but is otherwise identical to the second embodiment, and a plurality of discontinuous pumping areas 20 is formed in the circumferential direction of the outer circumferential surface S of the sleeve 4. The sleeve 4 is equivalent to a rotating member.

The pumping areas 20 will be described in detail hereafter.

Embodiment 4

Figure 4:
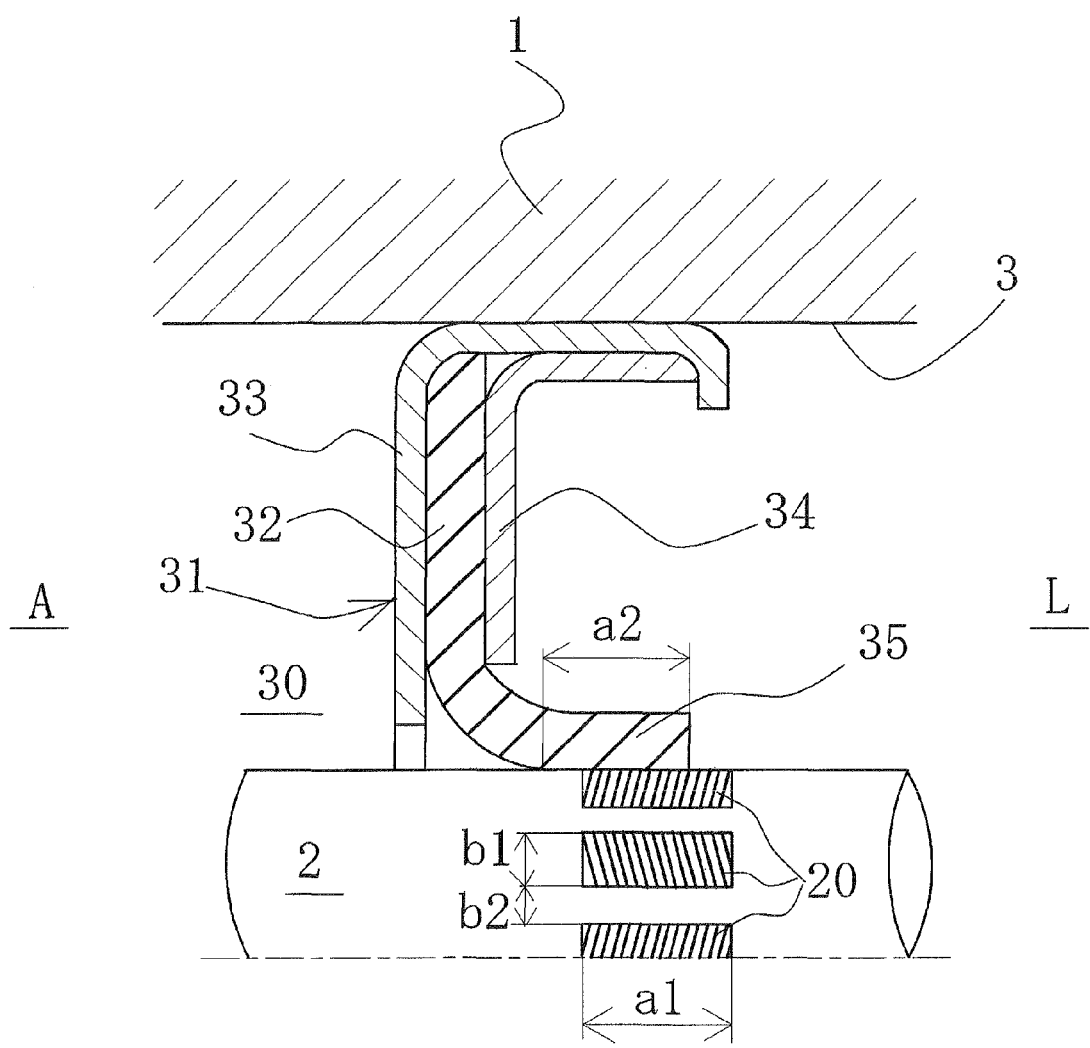
FIG. 4 is a longitudinal-sectional view of a shaft seal device according to a fourth embodiment of the present invention.

FIG. 4 is a longitudinal-sectional view of a shaft seal device according to a fourth embodiment of the present invention.

In FIG. 4, numbers identical to those shown in FIG. 2 signify members identical to those shown in FIG. 2, and detailed descriptions thereof will be omitted.

The fourth embodiment differs from the second embodiment in that an axial direction length a1 of the pumping areas 20 is roughly equal to or somewhat less than an axial direction length a2 in which the cylindrical lip 35 is in contact with the outer circumferential surface of the rotating shaft 2, the plurality of pumping areas 20 and the cylindrical lip 35 of the seal lip member 32 is disposed so that the cylindrical lip 35 covers the pumping areas 20 in the axial direction of the rotating shaft 2 while leaving part of the pumping areas 20 towards the sealed fluid side L uncovered, and the cylindrical lip 35 has a shape further extending towards the atmosphere side A and is disposed so as to slide with the outer circumferential surface of the rotating shaft 2 closer to the atmosphere side A than the pumping areas 20. In other words, a part of the pumping areas 20 toward the sealed fluid side L with respect to the axial direction is not covered by the cylindrical lip 35, and the pumping areas 20 are covered on the atmosphere side.

In this way, each of the plurality of pumping areas 20 is separated from adjacent pumping areas 20 in the circumferential direction by parts of the outer circumferential surface in which pumping areas 20 are not formed, and communicate with the sealed fluid side L. The sealed fluid side L and the atmosphere side A are cut off from each other by the pressed contact of the sealing faces S of the cylindrical lip 35 and the rotating shaft 2.

The pumping areas 20 will be described in detail hereafter.

Embodiment 5

Figure 5:
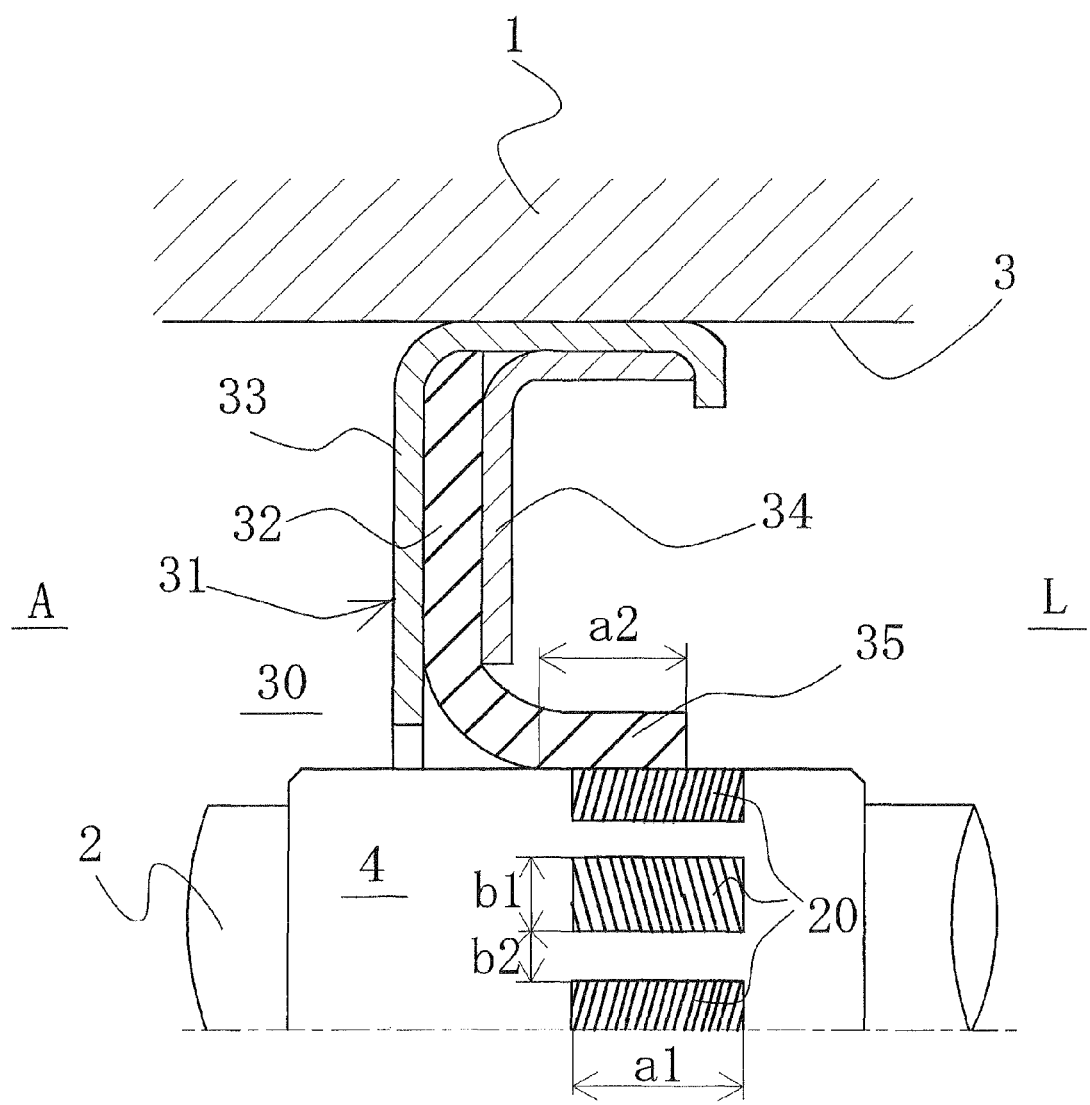
FIG. 5 is a longitudinal-sectional view of a shaft seal device according to a fifth embodiment of the present invention.

FIG. 5 is a longitudinal-sectional view of a shaft seal device according to a fifth embodiment of the present invention.

In FIG. 5, numbers identical to those shown in FIG. 4 signify members identical to those shown in FIG. 4, and detailed descriptions thereof will be omitted.

The fifth embodiment differs from the fourth embodiment in that a seal sleeve 4 is mated to the rotating shaft 2, but is otherwise identical to the fourth embodiment, and a plurality of discontinuous pumping areas 20 is formed in the circumferential direction of the outer circumferential surface S of the sleeve 4.

The sleeve 4 is equivalent to a rotating member.

The pumping areas 20 will be described in detail hereafter.

Embodiment 6

Figure 6:
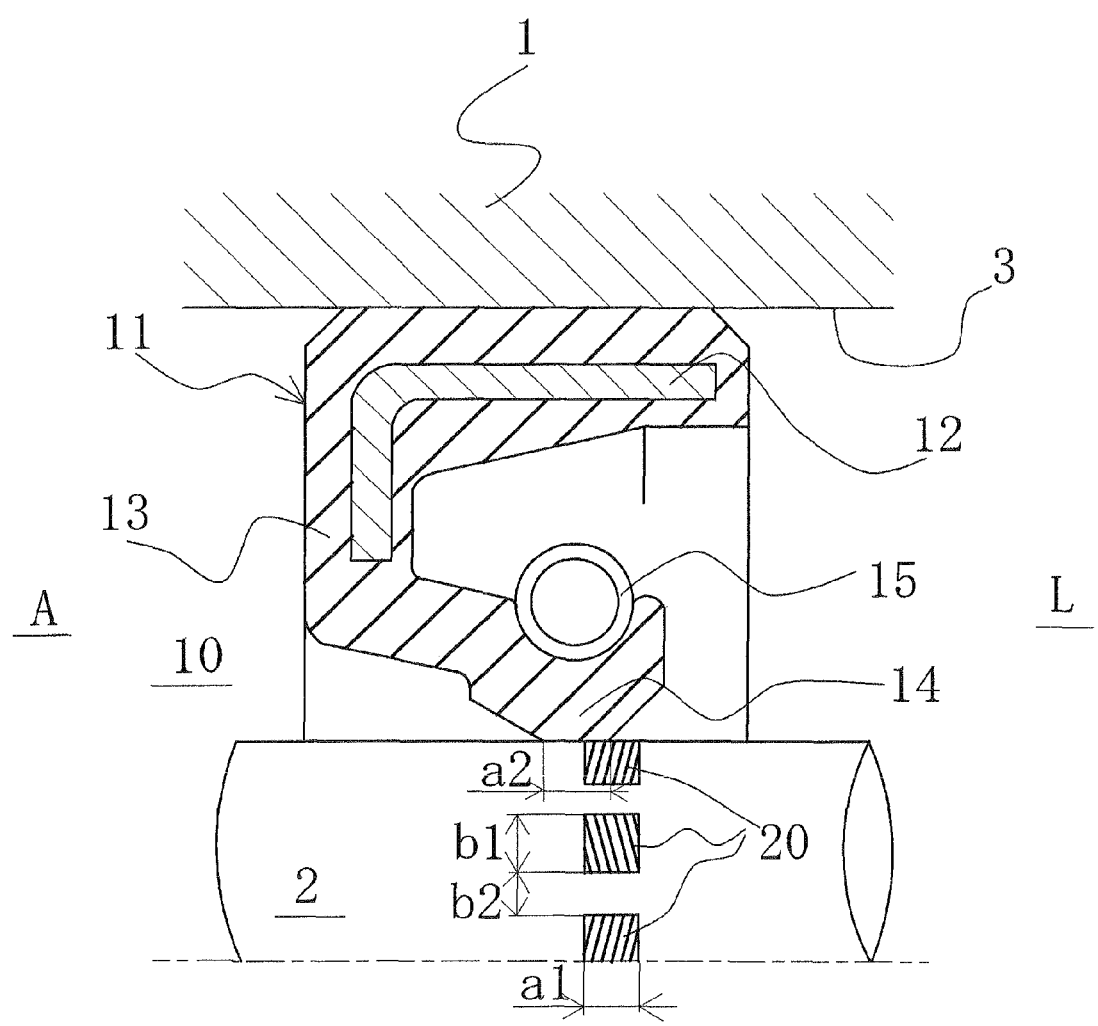
FIG. 6 is a longitudinal-sectional view of a shaft seal device according to a sixth embodiment of the present invention.

FIG. 6 is a longitudinal-sectional view of a shaft seal device according to a sixth embodiment of the present invention.

In FIG. 6, numbers identical to those shown in FIG. 1 signify members identical to those shown in FIG. 1, and detailed descriptions thereof will be omitted.

The sixth embodiment differs from the second embodiment in that an axial direction length a1 of the pumping areas 20 is roughly equal to or somewhat less than an axial direction length a2 in which the lip 14 is in contact with the outer circumferential surface of the rotating shaft 2, the plurality of pumping areas 20 and the lip 14 of the seal lip member 13 is disposed so that the lip 14 covers the pumping areas 20 in the axial direction of the rotating shaft 2 while leaving part of the pumping areas 20 towards the sealed fluid side L uncovered, and the lip 14 has a shape further extending towards the atmosphere side A and is disposed so as to slide with the outer circumferential surface of the rotating shaft 2 closer to the atmosphere side A than the pumping areas 20. In other words, a part of the pumping areas 20 toward the sealed fluid side L with respect to the axial direction is not covered by the lip 14, and the pumping areas 20 are covered on the atmosphere side.

In this way, each of the plurality of pumping areas 20 is separated from adjacent pumping areas 20 in the circumferential direction by parts of the outer circumferential surface in which pumping areas 20 are not formed, and communicate with the sealed fluid side L. The sealed fluid side L and the atmosphere side A are cut off from each other by the pressed contact of the sealing faces S of the lip 14 and the rotating shaft 2.

The pumping areas 20 will be described in detail hereafter.

The first embodiment depicted in FIG. 1 and the sixth embodiment depicted in FIG. 6, like the third embodiment depicted in FIG. 3 and the fifth embodiment depicted in FIG. 5, may also be applied to a device in which a seal sleeve 4 is mated with the rotating shaft 2, as shall be apparent.

{Configuration of Pumping Areas}

Figure 7:
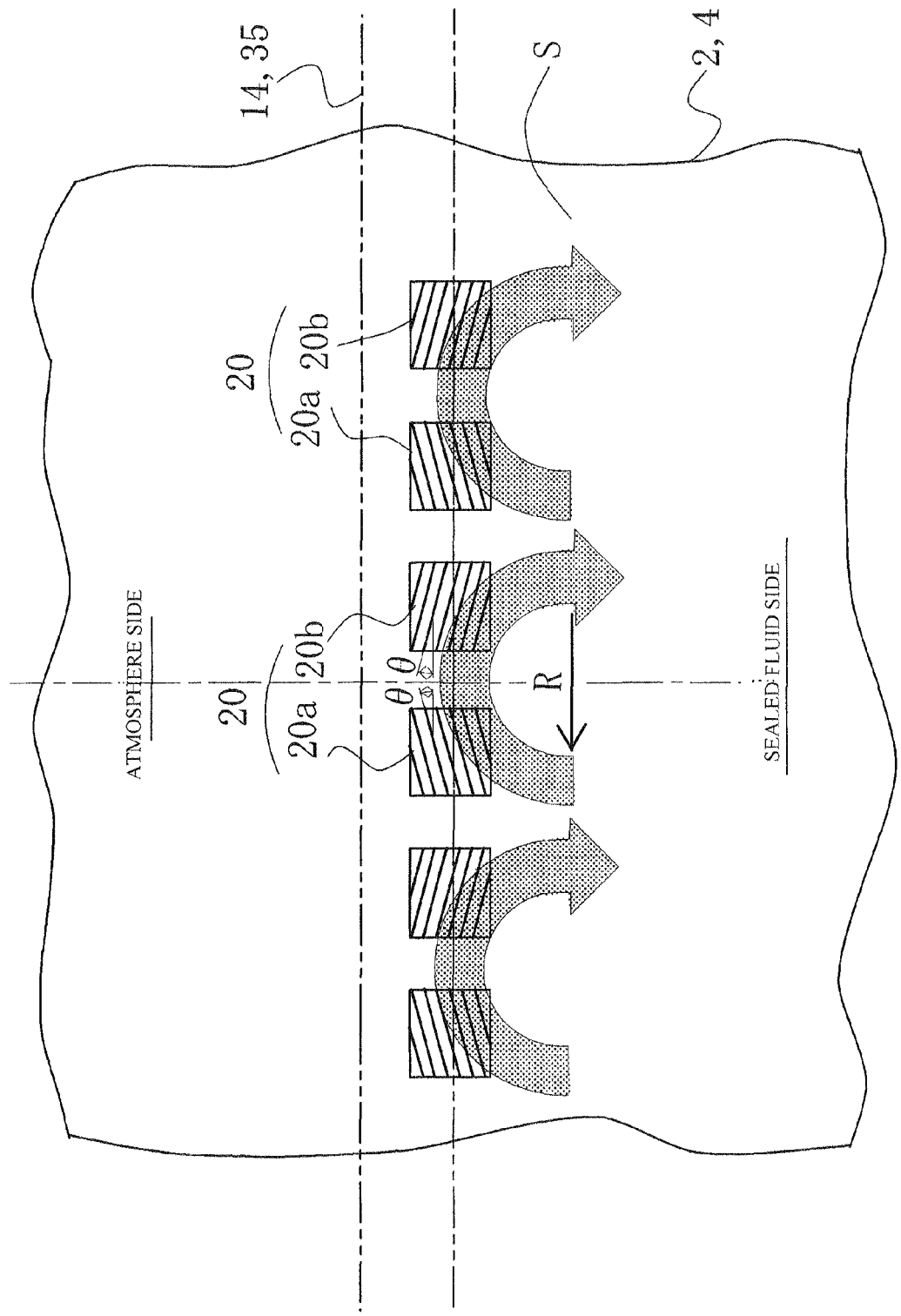
FIG. 7 is a plan view of pumping areas provided on the outer circumferential surface of a rotating shaft or a sleeve of the shaft seal device according to one of the first through the sixth embodiments of the present invention, showing part of the outer circumferential surface of the rotating shaft or the sleeve spread out flat.

FIG. 7 is a plan view of pumping areas provided on the outer circumferential surface of a rotating member such as a rotating shaft or a sleeve of the shaft seal device according to one of the first through the sixth embodiments of the present invention, showing part of the outer circumferential surface of the rotating member spread out flat. In FIG. 7, out of the first through the sixth embodiments, the pumping areas 20 of the first embodiment will be described as an example, and the pumping areas 20 of the second through the sixth embodiments are similarly configured.

In order to reduce friction upon the sealing faces of the seal lip member and the outer circumferential surface of the rotating member, a liquid film roughly 0.1 μm to 10 μm thick is necessary, depending on the type, temperature, and the like of the sealed fluid. In order to obtain such a liquid film, the present invention features a plurality of independent pumping areas 20 for generating a pumping action through the relative rotational sliding of the seal lip member 13 and the rotating member disposed in the circumferential direction on the outer circumferential surface of the rotating member, as described above. The pumping areas 20 are provided with suction portion of pumping areas 20a operating in a direction in which the sealed fluid is drawn in and discharge portion of pumping areas 20b operating in a direction in which the sealed fluid is expelled.

Figure 8:
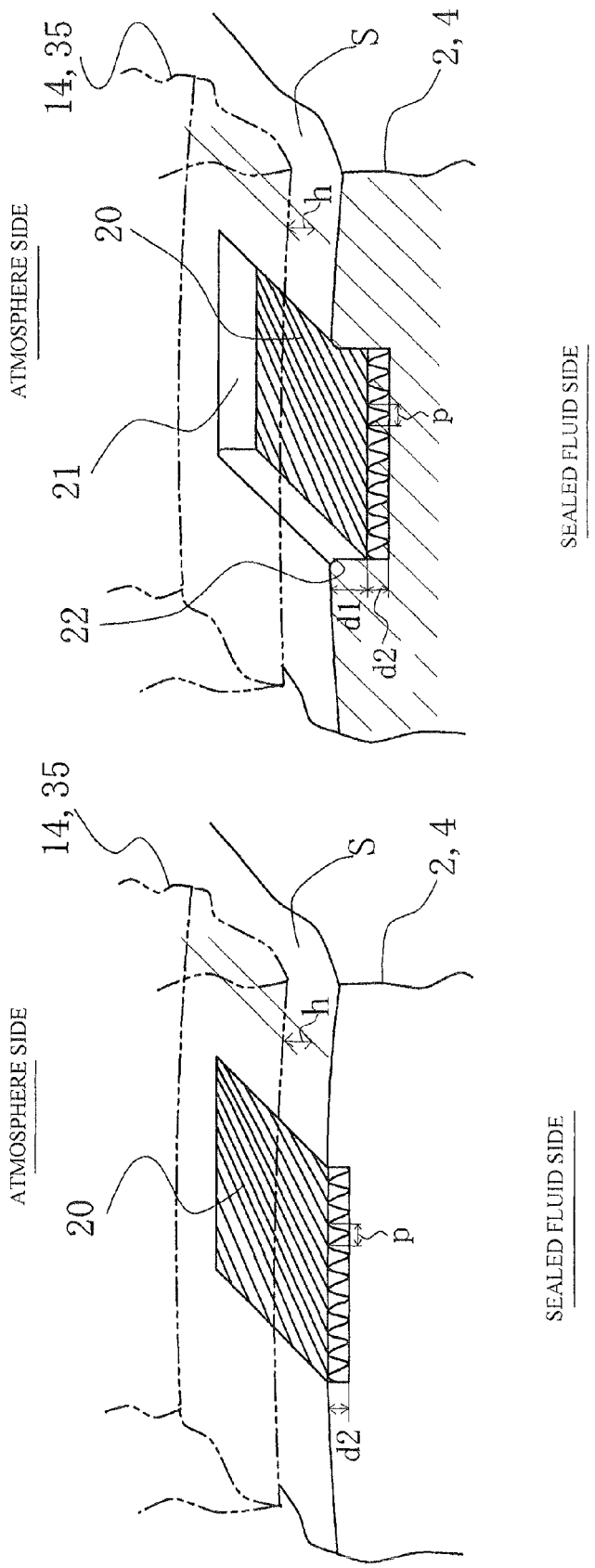
FIG. 8 is a perspective view of the pumping areas shown in FIG. 7 from a sealed fluid side.

As shown in detail in FIG. 8, a plurality of parallel linear indentations (also referred to as a "periodic linear indentation structure" in the present invention) is formed at a constant pitch in each of the pumping areas 20. As will be described hereafter, the periodic linear indentation structures are fine structures formed using, for example, a femtosecond laser.

In the present invention, the "linear indentations" encompass not only rectilinear indentations, but also somewhat curved indentations appearing during the process of forming rectilinear indentations, as well as curvilinear indentations.

Apart from the periodic linear indentation structures being formed flush with the outer circumferential surface of the rotating shaft 2 or the sleeve 4, it is also possible for indentations 21 to be formed in the outer circumferential surface, the periodic linear indentation structures being formed in the bottom surfaces of the indentations.

FIG. 7 depicts an instance in which the rotating shaft 2 rotates in a direction R, and the linear indentations formed in the pumping areas 20 are inclined at a predetermined angle θ with respect to the sliding direction of the sealing face S. The predetermined angle θ is preferably within a range from 10° to 80° with respect to the sliding direction of the sealing face S.

The angle of inclination θ with respect to the tangent line of rotation of the linear indentations in each of the plurality of pumping areas 20 may be the same for all pumping areas 20, or may differ for each of the pumping areas 20. However, because the sliding properties of the sealing faces S are affected by the angle of inclination θ, imparting the linear indentations of all of the pumping areas 20 with an appropriate specific angle of inclination θ according to the desired lubricity and sliding conditions is effective in order to obtain stable sliding properties.

Thus, if the sealing faces S rotatingly slide in a single direction, the angle of inclination θ of the linear indentations of the plurality of pumping areas 21 with respect to the tangent line of rotation will be defined as a specific optimal angle.

When the sealing faces S rotatingly slide in both the forward and the reverse directions, the presence of both first pumping areas having linear indentations inclining at a first angle with respect to the tangent line of rotation yielding suitable sliding properties during rotation in one direction and second pumping areas having linear indentations inclining at a second angle with respect to the tangent line of rotation yielding suitable sliding properties during rotation in the opposite direction is preferable. Such a configuration allows suitable sliding properties to be obtained when the sealing faces S rotate in the forward and reverse directions.

More specifically, if the sealing faces S rotate in both the forward and reverse directions, the angle of inclination of the linear indentations of the suction portion of pumping areas 20a and the discharge portion of pumping areas 20b are preferably formed so as to be symmetrical with respect to the tangent line of rotation.

The suction portion of pumping areas 20a and discharge portion of pumping areas 20b are preferably formed so as to be alternatingly disposed along the circumferential direction of the sealing faces S.

The suction portion of pumping areas 20a and discharge portion of pumping areas 20b depicted in FIG. 7 are preferable for cases in which the sealing face S rotates in two directions.

The suction portion of pumping areas 20a and discharge portion of pumping areas 20b need not be alternatingly disposed along the sealing faces S in the circumferential direction, but rather, for example, two suction portion of pumping areas 20a may be disposed for every discharge portion of pumping area 20b; or the reverse ratio is also acceptable.

The pumping areas 20, which are structures in which a plurality of parallel linear indentations is disposed with high precision at a predetermined pitch, are strictly divided, for example, by using a femtosecond laser within a predetermined area of the sealing face S, then precisely controlling the laser and forming in the direction of the indentations in each division.

If a substrate is irradiated using a linearly polarized laser at an irradiation intensity near a machining threshold value, the interference of the incident light and scattered light or plasma waves along the surface of the substrate will lead to an indented periodic structure having a wavelength-order pitch and groove depth self-forming orthogonally to the polarization direction. Here, the femtosecond laser may be operated while being made to overlap, thereby allowing a periodic structure pattern to be formed on the surface.

In a periodic linear indentation structure formed using a femtosecond laser in this way, the directionality thereof can be controlled, as well as the machining position, allowing a desired periodic linear indentation structure to be formed within each of disparate small divisions. In other words, if this method is used while the outer circumferential surface of the cylindrical rotating shaft or sleeve is being rotated, a fine periodic pattern can be selectively formed on the outer circumferential surface. In addition, using a machining method involving a femtosecond laser allows for the formation of indentations of sub-micron order depth, which are effective in improving the lubricity and reducing the leakage of the lip-type seal.

The periodic linear indentation structures are not limited to being formed using a femtosecond laser; a picosecond laser or electron beam may also be used. The periodic linear indentation structures may also be formed by performing stamping or engraving using a die provided with periodic grooves while the cylindrical sealing face is rotated.

If the periodic linear indentation structures are formed in the bottom parts of the indentations in the outer circumferential surface (sealing face), the indentations may be formed in the outer circumferential surface via etching, followed by the periodic linear indentation structures being formed in the bottoms of the indentations using a femtosecond laser or the like. The indentations may also be formed by forming only periodic linear indentation structures on the outer circumferential surface using a femtosecond laser or the like, then plating or forming a film around the periodic linear indentation structures.

FIG. 8 is a perspective view of the pumping areas shown in FIG. 7 from a sealed fluid side.

In order to reduce the friction of the sealing faces of the seal lip member and the outer circumferential surface of the rotating member, a liquid film h having a thickness of 0.1-10 µm is formed between the sealing faces depending on the type and temperature of the sealed fluid. In such cases, the depth of an imaginary plane connecting the apexes of the indentations in the pumping areas 20 is such that the plane is either flush with the sealing face S or set lower than the sealing face S according to the liquid film h. FIG. 8(a) shows an instance in which the distance d1 between the sealing face S and the imaginary plane is 0, i.e., the imaginary plane is flush with the sealing face S, and FIG. 8(b) shows an instance in which pumping areas 20 are in the bottom of indentations 21 formed in the sealing face S, the imaginary plane being set at a position lower than the sealing face S such that d1>0.

When the lip 14 of the lip seal or the cylindrical lip 35 slides in contact with the outer circumferential surface of the rotating shaft 2 in which the pumping areas 20 are formed, as shown in FIGS. 1-3, the distance d1 between the sealing face S and the imaginary plane is preferably such that $0 \leq d1 \leq 2$ µm from considerations of preventing leakage when the device is at rest. The depth d2 between the imaginary plane connecting the apexes of the indentations and the bottom parts thereof is preferably within the range $0 < d2 \leq 2$ µm, and the total of d1 and d2 is preferably such that $0 < d1 + d2 \leq 2.5$ µm.

On the other hand, if the lip 14 of the lip seal or the cylindrical lip 35 also slides along with the outer circumferential surface of the rotating shaft 2 closer to the atmosphere side than the pumping areas 20, as shown FIGS. 4-6, the distance d1 between the sealing face S and the imaginary plane is preferably within a range such that d1=0-10 h, and the depth d2 between the imaginary plane connecting the apexes of the indentations and the bottom parts thereof is preferably within a range such that d2=0.1-10 h.

The pitch p of the rectilinear indentations of the pumping areas 11 is set according to the viscosity of the sealed fluid, but, in any instance in FIGS. 1-6, is preferably in a range from 0.1 µm-100 µm. When the sealed fluid has a high viscosity, the pitch p should be increased so that sufficient fluid can enter the grooves.

When the pumping areas 20 are formed at the bottom of indentations 21 formed in the outer circumferential surface (sealing face S), the indentations 21 are first formed using a femtosecond laser, followed by the pumping areas 20. If the pumping areas 20 are formed in the bottom parts of the indentations 21 formed in the outer circumferential surface (sealing face S), the sealed fluid can be drawn into the space within the indentations 21, allowing for a copious fluid flow with no leakage to the atmosphere side to be formed by the pumping areas 20. In such cases, because the lip 14 of the seal lip member 13 scrapes past the upper edges 22 of the indentations 21, the upper edges 22 are preferably formed in a tapered or arcuate shape.

As described above, the sealing face S being continuously formed in the circumferential direction prevents leakage when the sliding parts are stopped, and sealed fluid being drawn into the pumping areas 20 upon activation allows for the rapid formation of a lubricant fluid film, enabling the sliding torque of the sealing face S to be lowered and friction to be reduced. Furthermore, during operation, sealed fluid is drawn into the suction portion of pumping areas 20a, sent over the sealing face S to the separately located discharge portion of pumping areas 20b, and returned to the sealed fluid side through the action of the discharge portion of pumping areas 20b. This sealed fluid flow allows the lubrication of the sealing faces S to be ensured, leakage to be prevented, and seal integrity to be preserved. In particular, when an imaginary plane connecting the apexes of the indentations within the pumping areas 20 is set lower than the sealing face S, the imaginary plane has a level difference d1 with the sealing face S, allowing a lubricant fluid film to be rapidly formed using the sealed fluid drawn into the indentations 21.

{First Pumping Areas Modification Example}

Figure 9:
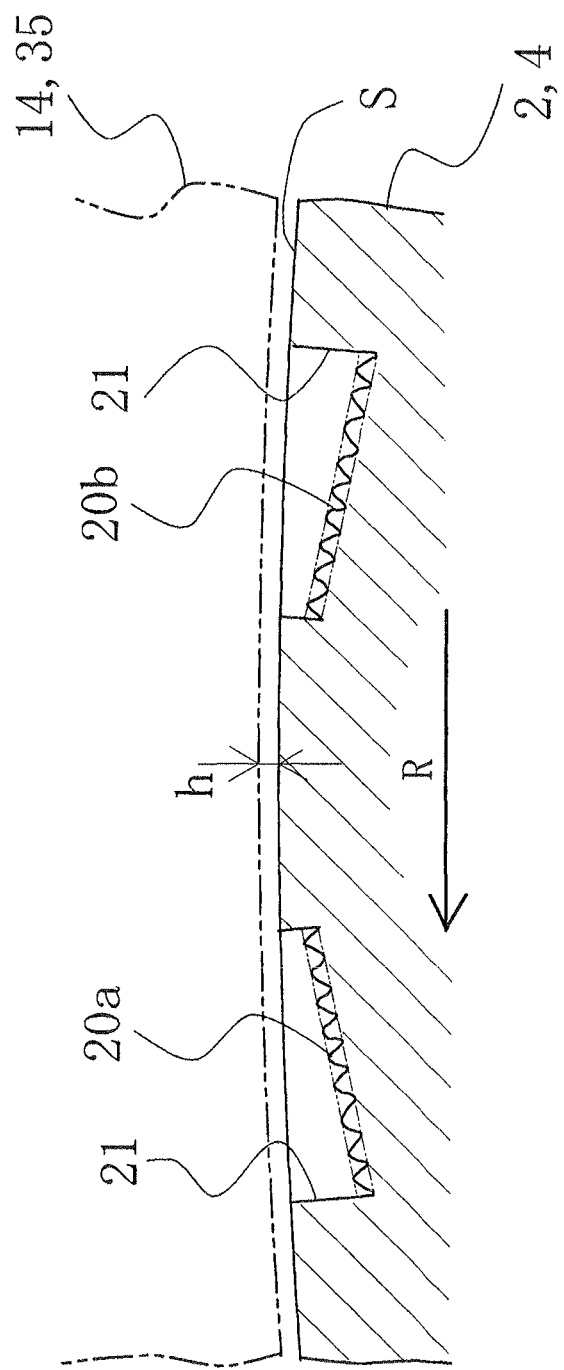
FIG. 9 is a cross-sectional view of a first modification of the pumping areas from a plane orthogonal to the rotating shaft.

FIG. 9 is a cross-sectional view of a first modification of the pumping areas from a plane orthogonal to the rotating shaft.

In FIG. 9, the suction portion of pumping areas 20a of the pumping areas 20 formed in the bottom parts of the indentations 21 are formed so that the linear indentations thereof grow progressively deeper in the rotational direction R of the rotating shaft 2, and the discharge portion of pumping areas 20b are formed so that the linear indentations thereof grow progressively shallower in the rotational direction R of the rotating shaft 2.

Because the linear indentations are both inclined with respect to the rotation tangent line as seen in plan view and inclined as seen from the side, the suction portion of pumping areas 20a are more capable of drawing in and sending the sealed fluid to the discharge portion of pumping areas 20b, and the discharge portion of pumping areas 20b are more capable of returning the received sealed fluid to the sealed fluid side.

Apart from being inclined in the circumferential direction, the linear indentations may also incline in the axial direction, or in both the circumferential direction and the axial direction.

In the case of the present example, if the lip 14 of the lip seal or the cylindrical lip 35 also slides in contact with the outer circumferential surface of the rotating shaft 2 closer to the atmosphere side than the pumping areas 20, the depths from the sealing face of the deepest part and the shallowest part of the imaginary plane connecting the apexes of the indentations need only fall within a range 0-10 h, h being the thickness of the liquid film formed between the sealing faces. If the lip 14 of the lip seal or the cylindrical lip 35 slides in contact with the outer circumferential surface of the rotating shaft 2 in which the pumping areas 20 are formed, the depths from the sealing face of the deepest part and the shallowest part of the imaginary plane connecting the apexes of the indentations need only fall within a range of 0-2 μm.

{Second Pumping Areas Modification Example}

FIG. 10 is a plan view of a second modification of pumping areas, showing part of the outer circumferential surface of a rotating shaft or a sleeve spread out flat, in which the rotating shaft 2 rotates in a direction R.

While forming suction portion of pumping areas 20a and discharge portion of pumping areas 20b of the same displacement in the outer circumferential surface of the rotating shaft 2 offers the advantage of allowing for usage in shaft seal devices rotating in both rotational directions, there is a risk of the suction portion of amount from the suction portion of pumping areas 20a exceeding the discharge portion of amount from the discharge portion of pumping areas 20b if the sealed fluid is highly pressurized, increasing the amount of leakage.

Figure 10A:
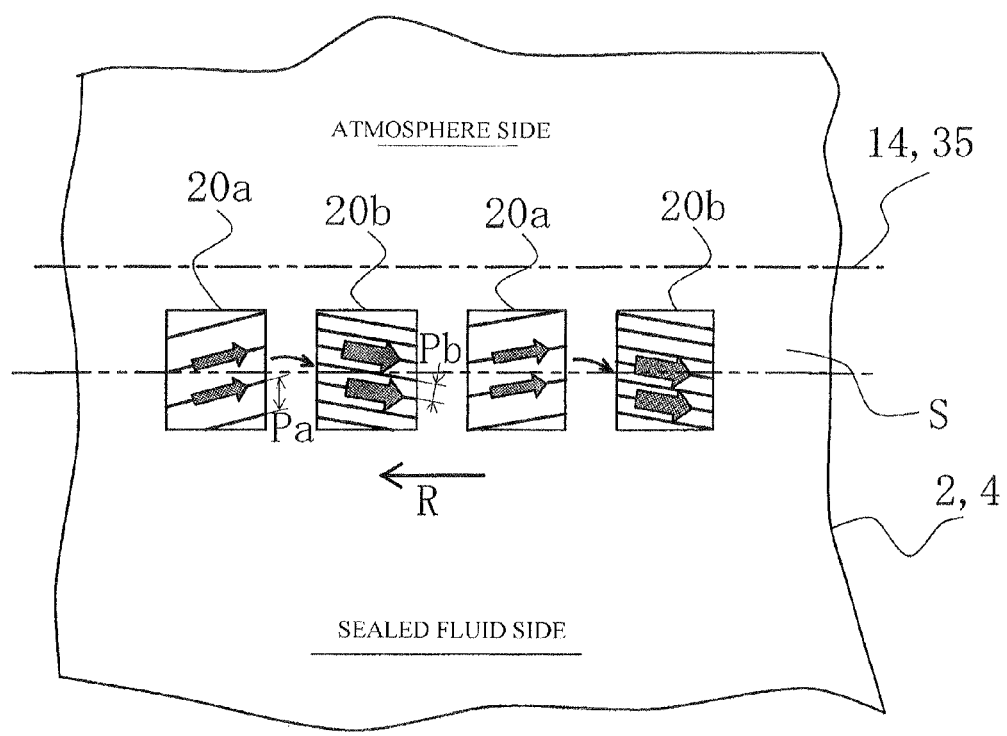
FIG. 10 is a plan view of a second modification of pumping areas, showing part of the outer circumferential surface of a rotating shaft or a sleeve spread out flat.

In FIG. 10(a), the pitch Pb of the linear indentations of the discharge portion of pumping areas 20b is less than the pitch Pa of the linear indentations of the suction portion of pumping areas 20a, and the discharge portion of displacement of the discharge portion of pumping areas 11b is greater than the suction portion of displacement of the suction portion of pumping areas 20a. Sealed fluid flowing in from the suction portion of pumping areas 20a is thus expelled to the sealed fluid side by the discharge portion of pumping areas 20b, preventing leakage to the atmosphere side.

Figure 10B:
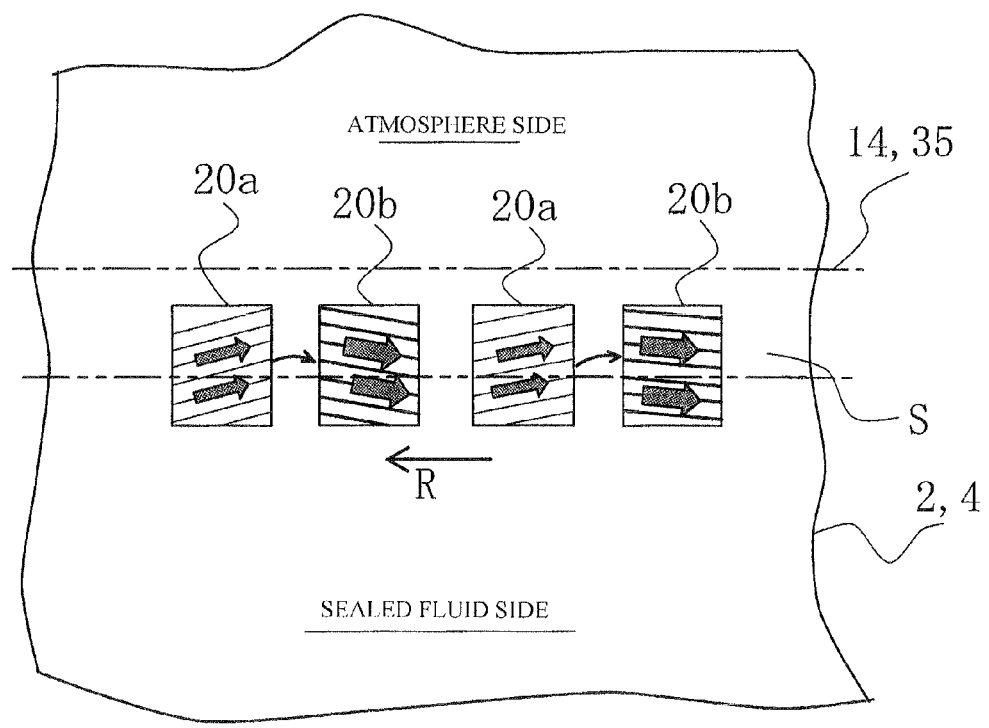

In FIG. 10(b), the width or depth of the linear indentations of the discharge portion of pumping areas 20b is greater than the width or depth of the linear indentations of the suction portion of pumping areas 20a, and the discharge portion of displacement of the discharge portion of pumping areas 20b is greater than the suction portion of displacement of the suction portion of pumping areas 20a. Sealed fluid flowing in from the suction portion of pumping areas 20a is thus returned to the sealed fluid side by the discharge portion of pumping areas 20b, preventing leakage to the atmosphere side.

{Third Pumping Areas Modification Example}

FIG. 11 is a plan view of a third modification of pumping areas, showing part of the outer circumferential surface of a rotating shaft or a sleeve spread out flat, in which the rotating shaft 2 rotates in a direction R.

While forming suction portion of pumping areas 20a and discharge portion of pumping areas 20b of the same displacement in the outer circumferential surface of the rotating shaft 2 offers the advantage of allowing for usage in shaft seal devices rotating in both rotational directions, there is a risk of the suction portion of amount from the suction portion of pumping areas 20a exceeding the discharge portion of amount from the discharge portion of pumping areas 20b if the sealed fluid is highly pressurized, increasing the amount of leakage.

Figure 11A:
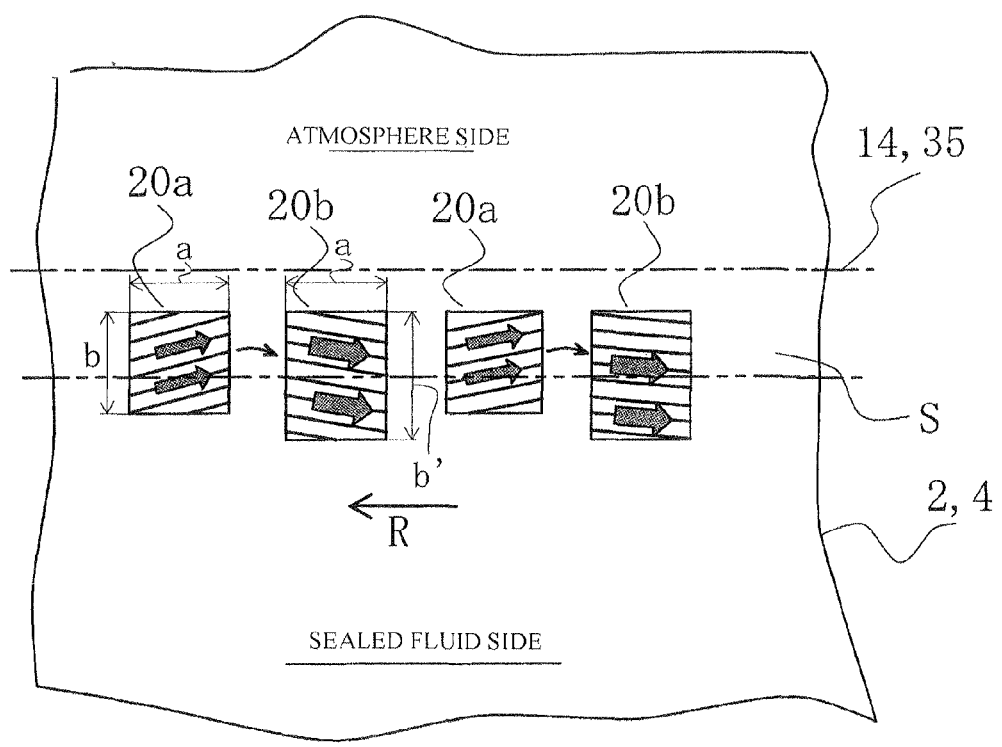
FIG. 11 is a plan view of a third modification of pumping areas, showing part of the outer circumferential surface of a rotating shaft or a sleeve spread out flat.

In FIG. 11(a), the length a of the suction portion of pumping areas 20a and the discharge portion of pumping areas 20b in the circumferential direction is identical, but the length b' of the discharge portion of pumping areas 20b in the axial direction is longer than the length b of the suction portion of pumping areas 20a in the axial direction, and the discharge portion of displacement of the discharge portion of pumping areas 20b is greater than the suction portion of displacement of the suction portion of pumping areas 20a. Sealed fluid flowing in from the suction portion of pumping areas 20a is thus returned to the sealed fluid side by the discharge portion of pumping areas 20b, preventing leakage to the atmosphere side.

Figure 11B:
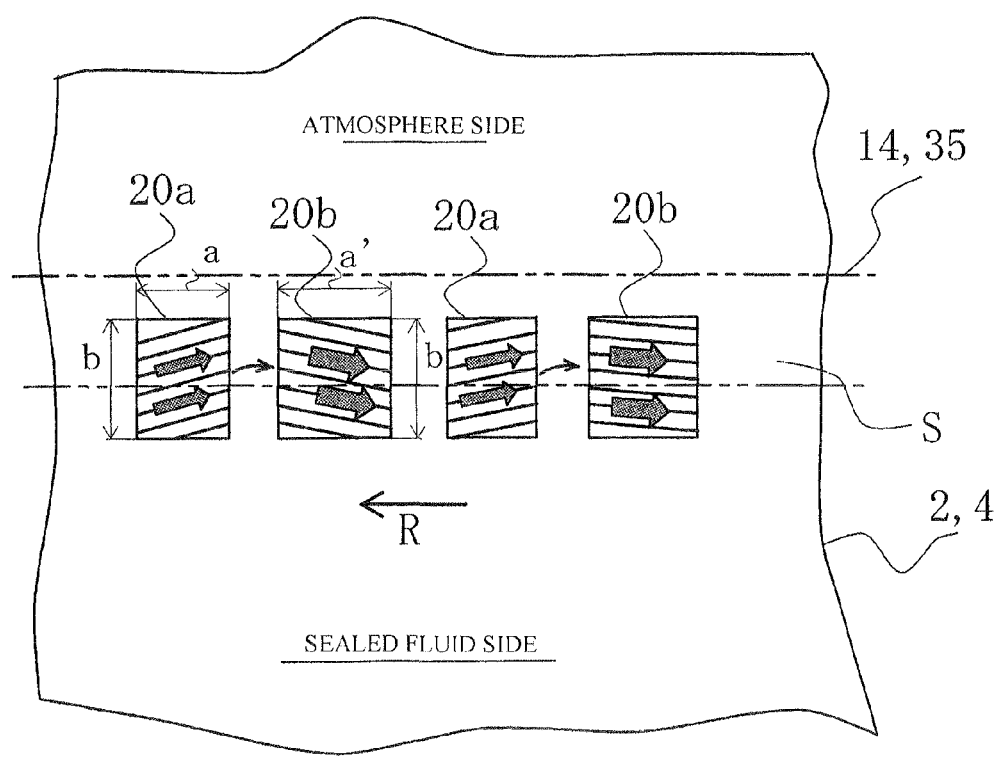
Figure 12:
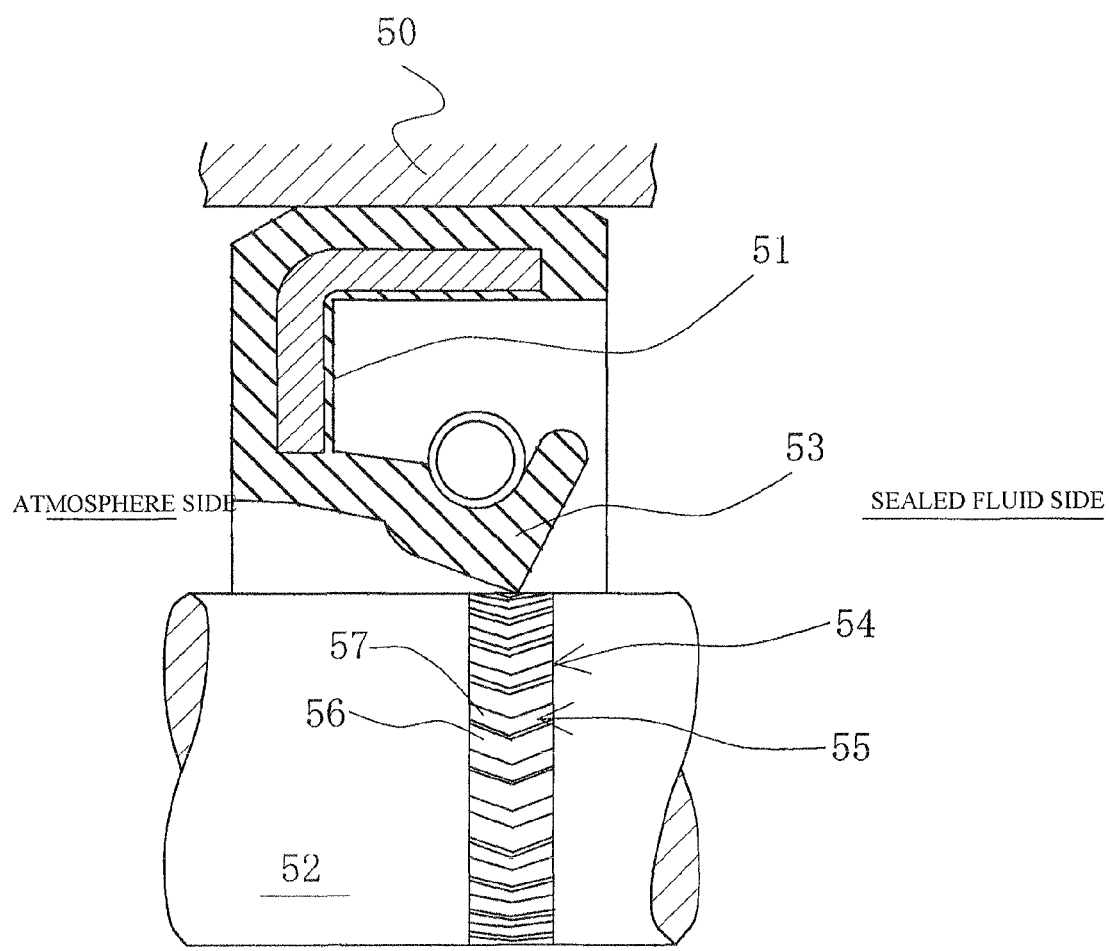
FIG. 12 is a longitudinal-sectional view of the first prior art.
Figure 13:
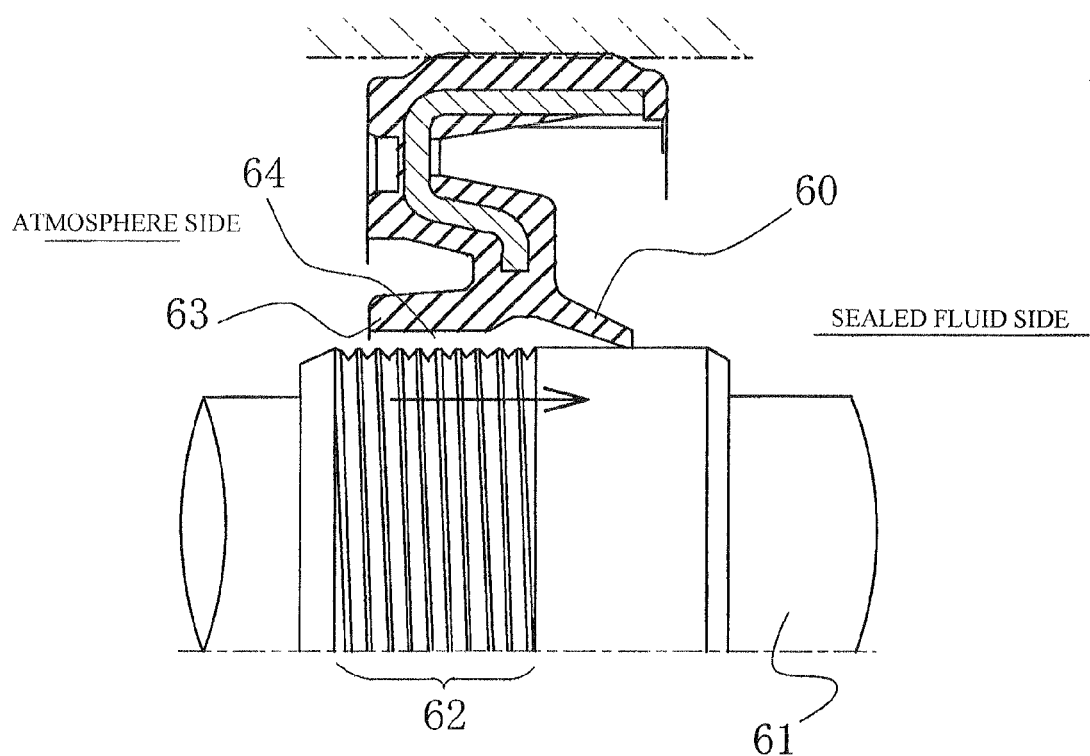
FIG. 13 is a longitudinal-sectional view of the second prior art.

In FIG. 11(b), the length b of the suction portion of pumping areas 20a and the discharge portion of pumping areas 20b in the axial direction is identical, but the length a' of the discharge portion of pumping areas 20b in the circumferential direction is longer than the length a of the suction portion of pumping areas 20a in the circumferential direction, and the discharge portion of displacement of the discharge portion of pumping areas 20b is greater than the suction portion of displacement of the suction portion of pumping areas 20a. Sealed fluid flowing in from the suction portion of pumping areas 20a is thus returned to the sealed fluid side by the discharge portion of pumping areas 20b, preventing leakage to the atmosphere side.

Though not shown in the drawings, it is also acceptable for the length of the discharge portion of pumping areas 20b in the circumferential or axial direction to be greater than the length of the suction portion of pumping areas 20a in the circumferential or axial direction, and the discharge portion of displacement of the discharge portion of pumping areas 20b to be greater than the suction portion of displacement of the suction portion of pumping areas 20a.

REFERENCE SIGNS LIST

1 Housing
2 Rotating shaft

3 Rotating shaft through-hole
4 Sleeve
10 Shaft seal device
11 Lip seal
12 Reinforcing ring
13 Seal lip member
14 Lip
15 Garter spring
20 Pumping area
20a Suction portion of pumping area
20b Discharge portion of pumping area
21 Indentation
22 Upper edge of indentation
30 Shaft seal device
31 Lip seal
32 Seal lip member
33 Metal bond ring
34 Metal clamp ring
35 Cylindrical lip
S Sealing face of rotating member
L Sealed fluid side
A Atmosphere side

The invention claimed is:

1. A shaft seal device comprising a rotating member, a stationary member, and a lip seal for creating a seal between the rotating member and the stationary member which are concentrically disposed one inside the other with respect to a radial direction; wherein:
 a plurality of suction portions and a plurality of discharge portions axially aligned with the plurality of suction portions are formed on an outer circumferential surface of said rotating member and disposed alternating around a circumference of the rotating member for generating pumping action via relative rotational sliding of said lip seal and said rotating member; and wherein:
 each suction portion and each discharge portion are circumferentially spaced from each other, each suction portion having first periodic linear indentations which are formed having a first direction of inclination at a first predetermined angle with respect to a circumferential direction of the rotating member so that the sealed fluid is drawn into the first periodic linear indentations, each discharge portion having second periodic linear indentations which are formed having a second direction of inclination at a second predetermined angle with respect to the circumferential direction of the rotating member so that-the sealed fluid is expelled from the second periodic linear indentations, and the first direction of inclination and the second direction of inclination being opposite to each other with respect to the circumferential direction of the rotating member,
 a lip of said lip seal extending in an axial direction toward an atmosphere side, leaving part of each suction portion and also part of each discharge portion towards a sealed fluid side uncovered, so that the sealed fluid side and the atmosphere side are cut off from each other by pressed contact of the lip.

2. The shaft seal device according to claim 1, wherein the lip of said lip seal is set so as to be in sliding contact with the outer circumferential surface of the rotating member in which each suction and each discharge portion is formed, leaving part of each suction and each discharge portion uncovered toward the sealed fluid side and toward the atmosphere side in the axial direction.

3. The shaft seal device according to claim 1, wherein the first and second predetermined angles are equal to each other.

4. The shaft seal device according to claim 1, wherein the first and second periodic linear indentations of each suction and each discharge portion are formed via irradiation by a femtosecond laser.

5. The shaft seal device according to claim 1, wherein the first periodic linear indentations of each suction portion are formed to grow progressively deeper in the rotational direction of the rotating member, and the second periodic linear indentations of each discharge portion are formed to grow progressively shallower in the rotational direction of the rotating member.

6. The shaft seal device according to claim 1, wherein upper edges of each of the first and second periodic linear indentations are machined into a tapered or arcuate shape.

7. The shaft seal device according to claim 1, wherein a pumping displacement of each suction portion and a pumping displacement of each discharge portion is the same, or the pumping displacement of one is greater than that of the other.

8. The shaft seal device according to claim 1, wherein a pitch of the periodic linear indentations of each discharge portion is less than a pitch of the periodic linear indentations of each suction portion.

9. The shaft seal device according to claim 1, wherein a width or a depth of the second periodic linear indentations of each discharge portion is greater than a width or a depth of the first periodic linear indentations of each suction portion.

10. The shaft seal device according to claim 1, wherein a length of each discharge portion with respect to the radial direction or the circumferential direction, is greater than a length of each suction portion with respect to the radial direction or the circumferential direction.

11. The shaft seal device according to claim 3, wherein the first and second periodic linear indentations of each suction and each discharge portion are formed via irradiation by a femtosecond laser.

12. The shaft seal device according to claim 3, wherein the first periodic linear indentations of each suction portion are formed to grow progressively deeper in the rotational direction of the rotating member, and the second periodic linear indentations of each discharge portion are formed to grow progressively shallower in the rotational direction of the rotating member.

13. The shaft seal device according to claim 4, wherein the first periodic linear indentations of each suction portion are formed to grow progressively deeper in the rotational direction of the rotating member, and the second periodic linear indentations of each discharge portion are formed to grow progressively shallower in the rotational direction of the rotating member.

14. The shaft seal device according to claim 2, wherein the first periodic linear indentations of each suction portion are formed to grow progressively deeper in the rotational direction of the rotating member, and the second periodic linear indentations of each discharge portion are formed to grow progressively shallower in the rotational direction of the rotating member.

15. The shaft seal device according to claim 3, wherein a width or a depth of the second periodic linear indentations of each discharge portion is greater than a width or a depth of the first periodic linear indentations of each suction portion.

16. The shaft seal device according to claim 4, wherein a width or a depth of the second periodic linear indentations of each discharge portion is greater than a width or a depth of the first periodic linear indentations of each suction portion.

17. The shaft seal device according to claim 2, wherein a width or a depth of the second periodic linear indentations of each discharge portion is greater than a width or a depth of the first periodic linear indentations of each suction portion.

* * * * *